United States Patent [19]
Orrin

[11] Patent Number: 6,011,849
[45] Date of Patent: Jan. 4, 2000

[54] ENCRYPTION-BASED SELECTION SYSTEM FOR STEGANOGRAPHY

[75] Inventor: Steven M. Orrin, West Orange, N.J.

[73] Assignee: SynData Technologies, Inc., Cedar Grove, N.J.

[21] Appl. No.: 08/919,203

[22] Filed: Aug. 28, 1997

[51] Int. Cl.[7] .............................. H04L 9/18; H04L 9/06; H04K 1/02
[52] U.S. Cl. .................. 380/42; 380/45; 380/37
[58] Field of Search .................. 380/42, 37, 45, 380/4, 5

[56] References Cited

U.S. PATENT DOCUMENTS

| | | |
|---|---|---|
| 4,200,700 | 4/1980 | Hellman et al. . |
| 4,405,829 | 9/1983 | Rivest et al. . |
| 5,008,935 | 4/1991 | Roberts . |
| 5,048,086 | 9/1991 | Bianco et al. .............. 380/28 |
| 5,159,633 | 10/1992 | Nakamura . |
| 5,177,790 | 1/1993 | Hazard . |
| 5,613,004 | 3/1997 | Cooperman et al. . |
| 5,778,074 | 7/1998 | Garcken et al. .............. 380/37 |

OTHER PUBLICATIONS

Szepanski, W., "A Signal Theoretic Method for Creating Forgery–Proof Documents for Automatic Verification," 1979 Carnahan Conference on Crime Countermeasures, pp. 101–109, May 1979.

Primary Examiner—Tod R. Swann
Assistant Examiner—Justin T. Darrow
Attorney, Agent, or Firm—Fulbright & Jaworski L.L.P.

[57] ABSTRACT

A data security system which produces a steganographic selection key by using an encryption key as both the key and as the data to be encrypted. First an encryption key is copied multiple times to form a data block which is then encrypted using the same key. The resulting ciphertext is then used as a selection key to select locations in a secondary data stream. These selected locations are then modified with the original data to be encoded. Restoration of the original data is accomplished by using the selection key to locate the modified areas of the data stream, extracting the data found there, and then decrypting the extracted data with the cyphertext.

12 Claims, 4 Drawing Sheets

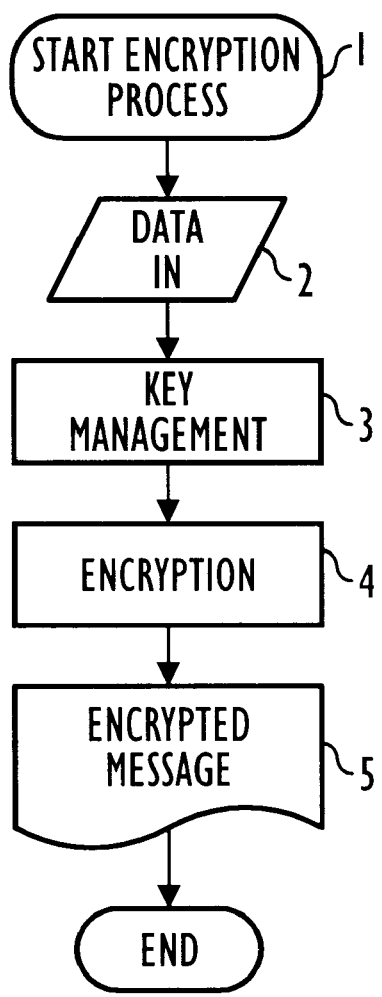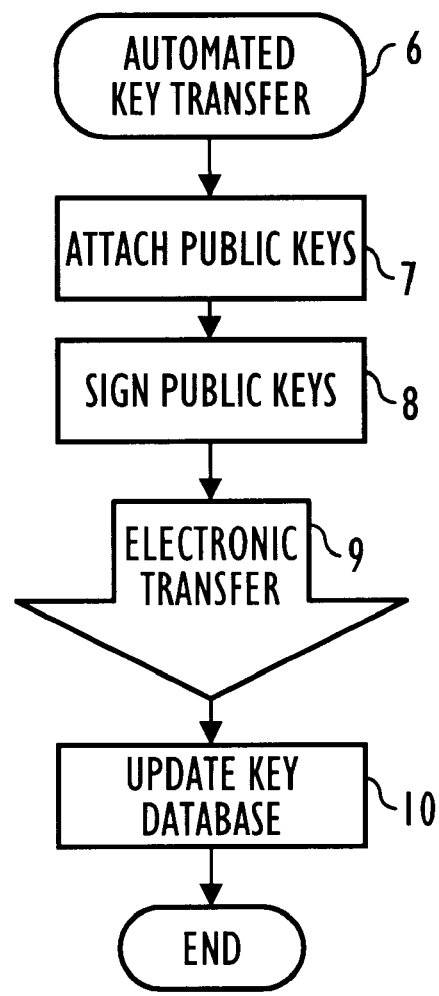
FIG. 1
FIG. 2

ENCRYPTION-BASED SELECTION SYSTEM FOR STEGANOGRAPHY

CROSS REFERENCE TO RELATED APPLICATIONS

The subject matter hereof is related to that set forth in U.S. patent application Ser. No. 08/919,190, entitled "Steganography System for Secure Data", U.S. patent application Ser. No. 08/919,212, entitled "Combined Encryption and Steganography System for Secure Data", and U.S. patent application Ser. No. 08/919,366, entitled "Data Backup Using Encryption and Steganograpy", each filed on an even date herewith, naming the same inventor hereof, and assigned to the same assignee hereof, the disclosures of all of which are incorporated herein by reference.

BACKGROUND OF THE INVENTION

1. Field of the Invention

The invention relates to digital data security technologies and communications and more particularly to a method and apparatus for securing data and permitting secure electronic communications relying on encryption and steganographic techniques.

2. Description of the Related Technology

Information and data transfer is growing at an alarming rate. The need for data security has also grown at an equal if not greater speed. The core problems that need to be addressed by any data security system are level of security, ease of use, integratability within the work environment, and mass/global level usage. By contrast, electronic communications are inherently insecure and open. Confidential and proprietary information and data are transferred regularly through channels which are in need of a secure and user-friendly methodology to facilitate confidentiality. Presently there are two basic approaches to securing information: access control (such as password protection), and encryption (single key, dual key, One Time Pad (OTP), steganography, and hardware). Each of these methods has its own advantages and disadvantages pertaining to implementation, design, level of security, interoperability, development, ease of use, and widespread adoption, use, and appeal.

Password protection is commonly used for access control but has inherent security level shortcomings when applied to data security.

Encryption has been implemented in five basic methodologies:

(a) Single key encryption—This uses an encryption algorithm along with an encryption key to encrypt and decrypt data. The same key is used in both encoding and decoding. The major shortcoming of single key technology is the transference of the key to the recipient. Most methodologies require a separate secure communication of the key to the recipient/decoder, via either fax, telephone or in person.

(b) Dual key encryption—Public key encryption solves this problem by utilizing different keys for encryption and decryption. The encryption-public key is given out insecurely to all potential encoders. The decryption-private key is kept by the recipient/decoder and not given out. Encryption is performed on data using the public key and only the private key can decode the data encrypted using its matching public half. Public key technology is primarily based on factorials of large prime numbers that facilitate the public and private key halves. There are presently several patents relating to public key technology, such as those held by RSA (U.S. Pat. No. 4,405,829) and Diffie-Hellman (U.S. Pat. No. 4,200,770). Presently, there are three shortcomings to the public key system in a large network. First, a repository capable of storing millions of public keys needs to be in place to facilitate Internet level global communications security. Second, due to the nature of public keys, they require large streams of data, and a method of authentication needs to be in place to validate the authenticity of the public keys within the repository. Third is the present difficulty and lack of ease of use inherent in today's public key products.

(c) One Time Pad (OTP) is an encryption methodology that provides a high level of security for encrypted information. However, due to its reliance on truly random sequences for the initialization key and the inability of software to provide truly random numbers, OTP is not suitable for the mass market of end users and corporate users for secure communications.

(d) Hardware encryption cards and boxes have been used for secure communications. Hardware encryption provides high level security and key management but is very costly. In addition, hardware encryption systems have not been compatible with other hardware systems, i.e. they lack interoperability. Hardware encryption is ideal for point to point communications or closed systems where cost is not a factor; they range from $1,000–$25,000 in cost. Hardware encryption systems are typically not suitable for open or mass communication applications.

(e) Steganography is a relatively new method for data security. Steganography, the art and science of hiding the existence of information, has in the past been primarily associated with invisible inks, messages sent via telephone line noise known as TranSec, and red cellophane such as that used in games to reveal information hidden in a red-blue block. Within the past two years, Steganography has migrated to the computer in the form of hiding information in graphical images, sound files, or other media including text files such as Mimic functions. Mimic functions convert plaintext letters into common everyday English words that are then put together to form pseudo-sentences. The resulting message resembles a Madlib™. When steganography is applied to graphic images, it encodes information in the code of a graphic file either in the pixel coding, high bits, or low bits of the coding. The former is useful for small messages but becomes apparent if large amounts of data are hidden. The latter two are more recent but are still in development stages as the encoding generates a noticeable deviation from the standard code of the graphics file. An example of a steganographic system is described by Cooperman et al. (U.S. Pat. No. 5,613,004), which is herein incorporated by reference in its entirety. All of these methods lose their security when the system is known and therefore should be used together with key based encryption for additional security.

SUMMARY OF THE INVENTION

This system features a data security method that combines the strength of encryption with the strength of steganography. According to the invention, a software or hardware package may provide both a secure method of communications via electronic communications systems and a secure work environment for data. The features and processes utilized in the invention deliver a cohesive standard by which data can be secured. Further the invention features an easy to use interface that is cohesive with standard protocols and procedures within both the corporate and individual environments. Finally, the interface combined with the high level of security and functionality lends mass market and global level appeal to the invention.

It is an object of the invention to provide an encryption and security program for a personal computer system such as those using the Windows environment. It is a further object to provide an easy-to use interface, and an easy-to-integrate environment. It is a further object to provide for file and document encryption, including selective partial document encryption; combined encryption and steganography for super secure domestic and secure international communications; multiple overwrite for deleted files; Digital Signatures for providing sender verification and document integrity validation; active document blanking for roaming eyes protection in impersonal or hostile work environments; steganographic key management; key list transfers; file compression; a secure key list back-up facility; administrative features; and unique registration and distribution features. Of course, the system also includes provisions for recovering the encrypted and encoded information.

Once the data has been encrypted and/or steganographically encoded, it may be transmitted to another system, kept in the present system, stored on a media, or any combination of those choices. Because of the exposed nature of most communications methods, the greatest need for such security is usually for transmitted data.

BRIEF DESCRIPTION OF THE DRAWINGS

FIG. 1 shows a flow diagram of the encryption process.

FIG. 2 shows a flow diagram of public key distribution.

DESCRIPTION OF THE PREFERRED EMBODIMENTS

A system according to the invention may encrypt files and documents with a choice of multiple algorithms and methods. One preferred embodiment may be designed with a modular open-ended architecture in an object-oriented scheme that allows the easy insertion of any encryption algorithm, including both single key and public key algorithms. The invention may utilize the modular design with flags that alert the program to the encryption method used for simple decryption and easy upgrade to multiple encryption algorithms and methods. Each algorithm is treated as a modular process that fits into the predefined call of the program. The program calls provide for a key(s) and input/output of data, thereby allowing for any encryption algorithm to be plugged in once configured to meet the specifications of the program calls.

The preferred embodiment uses a two-step process: an encryption algorithm(s) creates the ciphertext, which is then steganographically secured. Both conventional single key encryption and hybrid public/single key encryption systems can be used here. Since multiple types of encoding are contained in the system, each type using potentially different types of keys, key management is also a major feature. The flow charts of FIGS. 1–5 and 7 show the various processes involved in the system.

Figure 6:
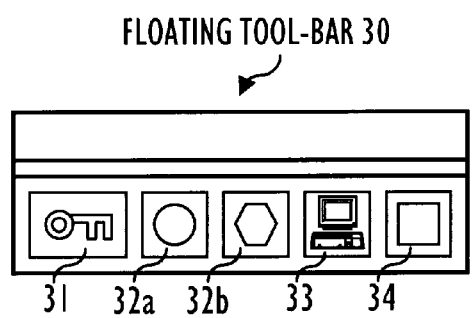
FIG. 6 shows an illustration of the floating toolbar user interface.

FIG. 1 shows the basic encryption process. In step 2 the data is input into the system through any suitable method (file selection or from within an application via a floating toolbar button as illustrated in FIG. 6), where key management is performed in step 3. Key management can be the insertion of a key by the user, a selected key from a key list, or other key selection methodology including randomly generated keys. The key(s) is then used by the encryption process of step 4 to encrypt the retrieved data. The encryption method used is determined by a configuration performed by the user or by a preset default. An encrypted message, or ciphertext, is produced at step 5 as a result of this process. If only basic encryption is desired, the process can end here with the ciphertext being returned to either a file or back into the application the original data came from. However, for greater security and/or innocuous messaging the ciphertext can be subjected to further encoding techniques, as described later.

FIG. 2 shows the basic key transfer process utilized by the invention when distributing keys for use in a public key encryption system. In step 7, public keys are selected from a list or database for transfer. Keys are digitally signed by the sender's signing key in step 8 and transferred in step 9 via electronic mail, a network system, or saved to a file for manual transfer. Upon receiving the transferred keys, the recipient system authenticates them using existing public keys, and the recipient's local database of keys is updated in step 10 with the transferred keys. This process enables users to utilize public key encryption as described in FIG. 1 for encryption of data and also for key authentication using a horizontal trust model.

Figure 3:
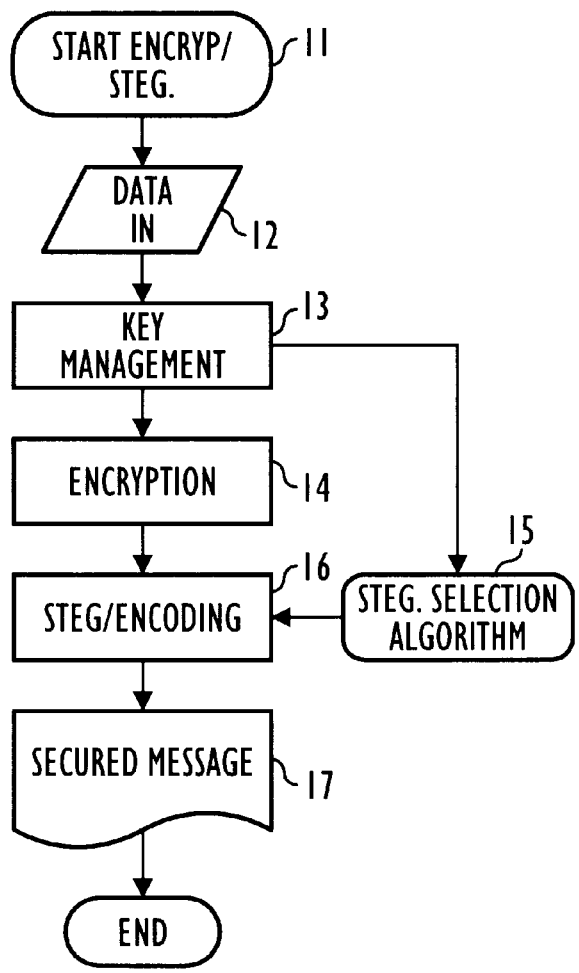
FIG. 3 shows a flow diagram of the process of combining encryption with steganography.

FIG. 3 shows a two-step encoding process, with encryption followed by steganographic encoding. Steps 12 through 14 correspond to steps 2 through 4 in FIG. 1, which produce a ciphertext through standard encryption techniques as described earlier. In step 15, a steganographic selection algorithm (SSA) uses the ciphertext in a bit-to-byte correspondence for selection of replaceable characters/bytes. The replacement produces the steganographically encoded result at step 17. The details of this process are expanded in FIGS. 4 and 5.

Figure 4:
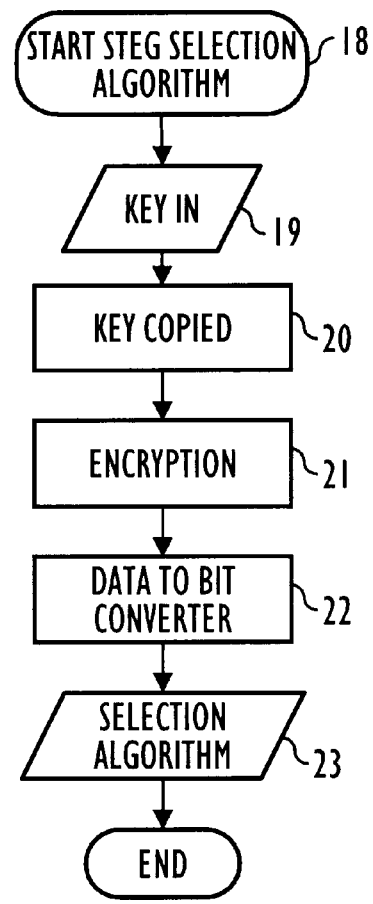
FIG. 4 shows a flow diagram of the steganographic selection algorithm process for generation of the selection algorithm.

FIG. 4 shows the details of the steganographic selection algorithm (step 15 of FIG. 3), which uses an encryption key as both a key and as data to be encrypted. A key is chosen in step 19, either randomly generated or chosen by the user, and repeatedly copied in step 20 until the result is the same size as the data stream or media which will be steganographically modified. This result is then encrypted in step 21 with the same key to produce a selection ciphertext. In step 22, each bit of the selection ciphertext is then associated with a byte (or pixel, or other suitable unit) in the data stream. The selected data stream bytes are those whose associated bit in the ciphertext is a logic '1' (or alternately, a logic '0'). In a preferred embodiment, every data stream byte has an associated bit in the selection ciphertext, but for greater security only every nth byte can have an associated bit. While this selection algorithm is described in the context of steganographic data encoding, it can also be used for any other selection applications in which the selected units are to remain secret.

Figure 5:
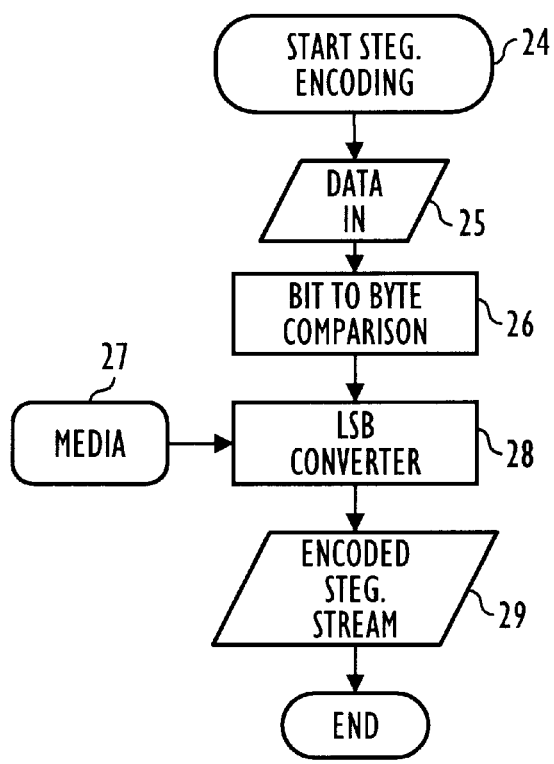
FIG. 5 shows a flow diagram of the process of steganographically encoding data into a stream of data bits.

FIG. 5 shows the details of the steganographic encoding process (step 16 of FIG. 3). The data to be encoded is brought in at step 25, and in step 26 each bit of this data is associated with a selected byte in the data stream or media to be modified. The data stream or media can be a random number stream, multimedia file such as a graphic image or sound file, a text document, or some other form of data. In step 27 the media is brought in for association with the bits in step 26. Using the selection algorithm developed in FIG. 4, the least significant bit of each selected byte is replaced in step 28 by the corresponding data bit from step 26. This newly modified data stream or media represents the encoded steg-stream of step 29 which produces the secured message shown in step 17 of FIG. 3.

This process can also be described in mathematical terms. The steganographic selection algorithm is a reproducible random selection process utilizing ciphertext as the selection operand, where:

k=any key
d=any target data
n=length in bytes of target data
$\theta = S_{(x)}$
$S_{(x)}$=A selection of x $$f_0(d, f_x(k)) = d_x$$
$$f_x(k) = f_r(n_d, K) = k_d^n \quad : \quad n_k^n = n_d$$
$$\&$$
$$f_c(k_d^n, k) = (k_d^n)_k \quad : \quad (k_d^n)_k \neq k_d^n$$
$$\therefore f_0((k_d^n)_k, d) = d_x$$

The invention utilizes an encryption algorithm and resulting ciphertext to enable a selection of data. The selection, $f_0()$, is performed on the data, d, based on the bits from the resulting ciphertext, $f_x(k)$, where k is the encryption key and $f_x()$ is the process by which the key is used as both the encryption key and the plaintext, created by $f_r()$, $f_r()$ takes the encryption key, k, and copies it back to back such that the resulting plaintext is equivalent in size, n, to the target data, $n_d$, to be selected from. $f_c()$ uses the encryption key, k, to encrypt the plaintext resulting from $f_r()$, or $k^n_d$. The resulting ciphertext, $(k^n_d)_k$, is then used in a bit-to-data comparison to facilitate selection of units where d is the target data to be selected from and x is the selecting bit from the ciphertext. Either a 1 or 0 can be used as the selecting bit. $d_x$ is the resulting selected units from the data.

The steganographic encoding process can be described mathematically by the following:

m=any medium
d=original data
n=length in bits of original data
$f_s()$=a selection process
$f_l()$=a least significant bit conversion
$f_{s2s}(m, m'_d)=m''$
$f_s(m)=m'$
$f_l(m', d_{0-n(d)})=m'_d$ This process of encoding data within other data can be facilitated by the use of:

(1) any medium, or data stream into which the original data will be encoded, such as that produced by a pseudo random number generator (PRNG);
(2) the selection process;
(3) a key to feed the selection process; and
(4) the original data, to be encoded into the medium.

The invention performs a least significant bit conversion on the medium where the bits from the original data are then inserted into selected bytes of the medium at the least significant bit position. The selection of bytes from the medium is performed by some selection process, such as an algorithm, character key, or other method.

As an example, a random stream generated by a PRNG can be used as the medium. Data is encoded or hidden in the stream by converting the least significant bits from selected bytes of the medium into the bits from the original data, whether in plaintext or ciphertext form.

An example of an encoding is as follows:

Object: Hide the word "it."
The bit sequence for the word "it" is: 01101001 01110100.
The original PRNG stream:
aku245q9S53'%14hj2q356@$%d070c6*&56) (noiury24r0q34ikjh3982h' H*37Hqdhg (dg&h#daghhhaead43y3q8uQ#8y3d203emape3m'zd+w[2oh[2

Selection of the characters to be converted (underlined):
<u>a</u>ku245q9S53'%14h<u>j</u>2q356@$%<u>d</u>070c6*&56)(<u>n</u>o <u>i</u>ury24r0q34<u>i</u>kjh3982<u>h</u>' <u>H</u>*37Hqdhg(dg&h #daghhhaead43y3q8uQ#<u>+b 8</u>y3d203ema<u>p</u>e3 <u>m</u>'zd+w[2oh[2

The bit sequences of the characters selected:

| a | q | j | d | n | i |
|---|---|---|---|---|---|
| 01100001 | 01110001 | 01101010 | 01100100 | 01101110 | 01101001 |
| i | h | | | | |
| 01101001 | 01101000 | | | | |
| H | * | q | # | 8 | p |
| 01001000 | 00101010 | 01110001 | 00100011 | 00111000 | 01110000 |
| m | [ | | | | |
| 01101101 | 01011011 | | | | |

The bit sequence for the word "it," 01101001 01110100, is hidden in the selected byte sequences by least significant bit conversion:

| 0110000<u>0</u> | 0111000<u>1</u> | 0110101<u>1</u> | 0110010<u>0</u> | 0110111<u>1</u> | 0110100<u>0</u> |
|---|---|---|---|---|---|
| 0110100<u>0</u> | 0110100<u>1</u> | | | | |
| 0100100<u>0</u> | 0010101<u>1</u> | 0111000<u>1</u> | 0010001<u>1</u> | 0011001<u>0</u> | 0111000<u>1</u> |
| 0110110<u>0</u> | 0101101<u>0</u> | | | | |

The characters represented by the new byte sequences are: 'qkdohhiH+q#8ql\

These characters are now placed back into the stream from whence they came, giving a new data stream (the replacement characters are underlined):
<u>'</u>ku245q9S53'%14h<u>k</u>2q356@$%<u>d</u>070c6*&56)(<u>o</u>o h<u>u</u>ry24r0q34<u>hk</u>jh3982<u>i</u>' <u>H+</u>37Hqdhg(dg&h #daghhhaead43y3q8uQ#<u>8y</u>3d203ema<u>q</u>e3<u>l</u>'zd+w[2oh<u>\</u>2

The file to be 'stegged', i.e., the data stream in which the message will be hidden, is selectable by the user. This file can be in many formats, but for effective security it should be the type of file that can be modified without such modification being obvious. In addition to the PRNG file previously mentioned, other preferred formats are: graphics (BMP, GIF, JPG, etc.), sound (WAV, RA, AIF, MIDI, etc.), and video (MPG, MOV, etc.). Depending on the degree of modification, these files might be usable for graphics, sound, or video in their modified form without noticeable performance degradation, thus further obscuring the fact that they contain encoded data.

The system also has a number of other features which give the user a range of selectable security functions:

Toolbar User Interface (TUI)—The system utilizes a floating toolbar that gives the user simple accessibility to security functions throughout the operating system environment. FIG. 6 shows an example of selections available from the toolbar. Item 31 is the toolbar's handle which enables both the drag and docking of the toolbar in the environment and, by right mouse clicking on the handle, allows for the configuration of the toolbar and other setup options. Items 32a and 32b are the encrypt and decrypt buttons which allow users to select both files and data from outside the application to be encrypted by the invention. Item 33 is the active window protection button. Item 34 is the place holder for other features configurable for use on the toolbar with the default being the exit function.

Selective Text Encryption—The system allows the user to highlight and select portions of the text, including paragraphs, sentences, even words, to be encrypted within a plaintext document. Delimiters are used so that a user decrypting the selected text does not have to identify its exact boundaries.

Secure Delete—In most computers, deleted files are still retrievable after deletion because only the file's index pointer information has been removed, whereas the file itself is still intact. The system provides a secure deletion facility that will overwrite a file first with a set such as all 0's and then with the set's compliment such as all 1's, and then with one or more overwrites of random data before deleting the file. This protects the user from having files retrieved from the drive after deletion. This function is selectable by the user.

Digital Signatures—The system provides Digital Signature capability to its users. Digital Signatures verify the origin and document integrity using one way hash functions and the Signing key belonging to the user. The system generates a hash sequence based on the contents of a document and then encrypts it with the Signing key. This sequence can be checked by the recipient to validate the sender and the contents of the document by decrypting the hash sequence using the verification key, packaged with the user's public key, and then comparing the hash of the document to the one contained in the Digital Signature. Digital Signatures can be used on both plaintext as well as ciphertext messages.

Partial Screen Blanking—This provides a secure work environment by covering most of the active window with a graphic image. The active window is protected up to approximately the last ¾ inch of the window. The graphic image acts like a window shade and can be manipulated using the mouse to cover more or less of the active window. This allows the user to continue entering data and have the rest of the document secured from view. This feature is especially useful when the screen is in an unsecured area, where "roving eyes" can be a problem. Partial screen blanking toggles on and off via a button on the TUI and can also be set to require a key to be toggled off.

Key Management—The invention utilizes a special key management system incorporating public and single key technologies with Digital signatures and certificate formats, combined with ease of use to allow easy integration of a public key communication system without the need for a fully implemented public key infrastructure. The invention utilizes hybrid encryption. Data is encrypted using a Pseudo Random Number Generator (PRNG) generated session key to create the message ciphertext. The session key is then encrypted using either a recipient's public key (for transmission security), or a predetermined user local key (for storage security). A header is added to the message ciphertext containing the encrypted session key and other information necessary for decryption purposes. The other information contained in the header includes algorithm identifiers, file name, time and date information, sender name, and a digital signature if that option is selected. The header is divided into protected areas and clear text areas where protected areas are also encrypted and clear text areas are the minimum information needed to decrypt the header and message ciphertext upon receipt without undermining the security of the system.

Public keys are transferred between corespondents via a key transfer utility included in the invention that facilitates a transparent Internet and/or network-based transfer of public key information. The public keys are X.509 certificate formatted in compliance with the standards for compatibility with Certificate Authorities (CA's) and can also be digitally signed by the sender to provide a horizontal Web of Trust infrastructure. Transmitted public keys contain the public half of the public key pair, the verification key, sender username and e-mail address, and any authentication information available to the sender including previous senders' signatures and digital identifications provided by CA's. Public keys are maintained in a database where authentication information is also associated with each public key.

The user's secret information includes the user's private half of the public key pair, the user's signing key and the user's local encryption key. These are secured locally by the user.

The system allows the user to utilize encryption and steganographic capabilities to both secure data and allow for innocuous messaging. As described above, a message or file is encrypted and steganography is used to encode the encrypted file into a graphic image, sound or movie file.

File compression—A file compression utility is provided for the encrypted file to reduce file sizes.

Figure 7:
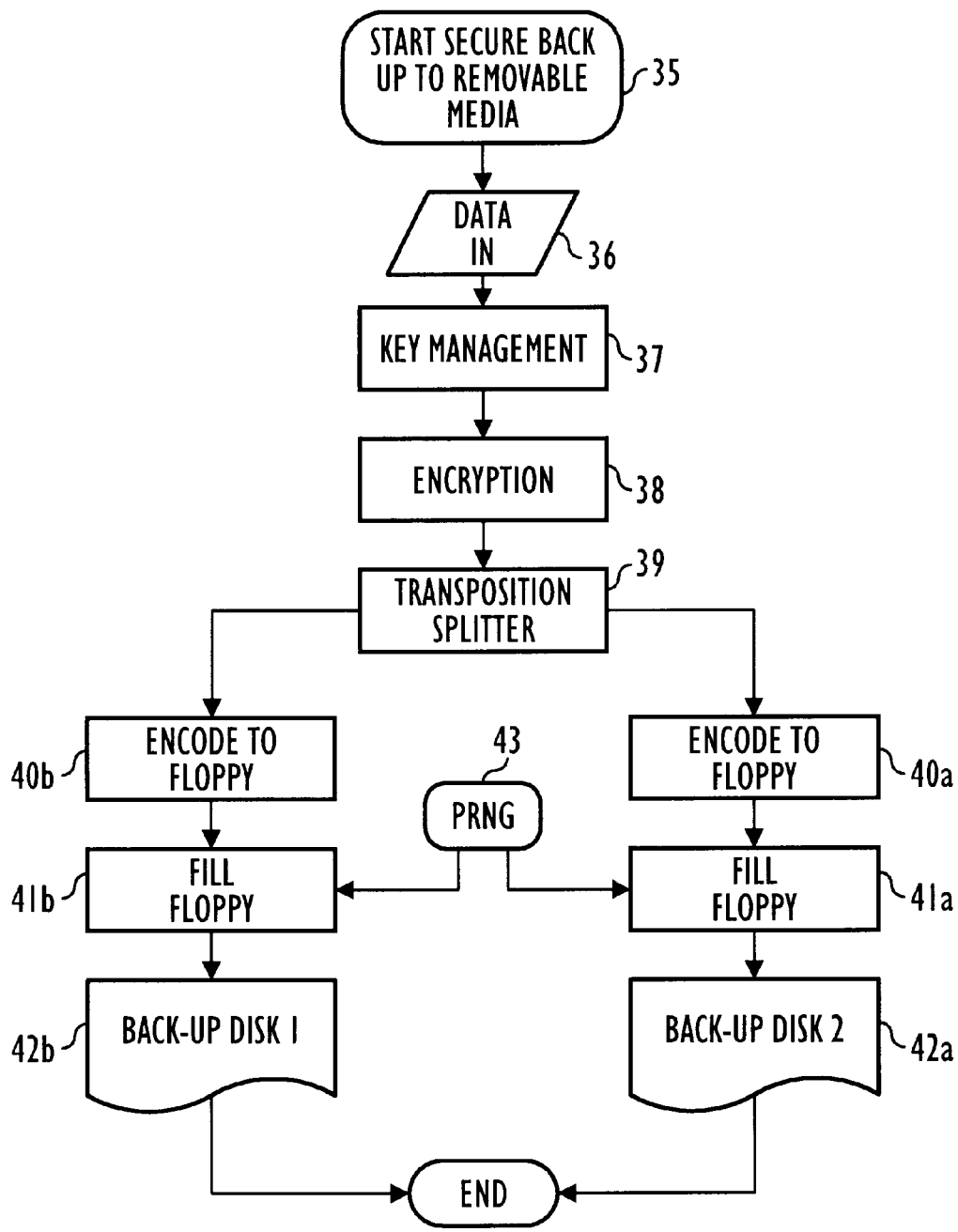
FIG. 7 shows a flow diagram of combining encryption and steganography for the purpose of secure backup to removable media, as may be used for storage of personal or administrator keys.

Secure Backup on Removable Media—This provides a method by which users can back up and store off-line on removable media important data such as personal decryption keys, Administrator keys, key pairs, or other highly confidential information and data. As shown in FIG. 7, data is input into the system, encrypted, and then encoded onto the removable media. FIG. 7 illustrates this process using two floppy diskettes. In a preferred embodiment, this process can be performed to multiple floppies and onto almost any removable media such as recordable CD-ROMs, Zip Disks, Back Up Tapes, etc. It can also be used with multiple locations of remote or local non-removable storage, although this might provide a lesser degree of security. In step 36 the data, which could consist of personal keys or Administrator public key pairs, is input into the system. In step 37 key management is performed to determine the encryption key(s) for the data, such as a public key for a system administrator and a randomly generated session key. The data is then encrypted in step 38 using an encryption algorithm as in FIG. 1 utilizing the keys from step 37. At step 39 the encrypted data is split into files corresponding to the number of removable media to be used. This splitting function involves taking bytes from the encrypted data and placing them into separate files such that each byte is placed in a different file than its adjacent bytes. For example, if three files were to be created using the splitting process in step 39, and 'abedefghijklmno' was the starting file to be stored, the resulting split files would be: 'adgjm', 'behkn', and 'cfilo'. This process eliminates unwanted exposure of partial ciphertexts in the event that the security of one or more of the split files is compromised. In step 40, each split file is written to selected sectors of its removable media. The key produced in step 37 is used to choose the exact sector(s) on the removable media where the files are written. The keys themselves can also be written to one or more of the removable media, such as the first one. Both file(s) and keys can be written without headers. In step 41 the removable media is written to by a pseudo-random number generator (step 43) to "fill" the remaining sectors of the media with random noise. This filling process writes the random data to all sectors of the removable media except those previously written to. The removable media now contains the split files of the encrypted data masked into random noise. This process represents another form of steganography, since it entails the 'hiding' of sensitive data among other, non-sensitive data.

Retrieval of the hidden data can occur by effectively reversing the aforementioned process: Key management is first performed to retrieve the relevant key(s) from the media. Then each split file is retrieved using the proper key(s), the multiple split files are merged, and decryption is performed on the merged file. This is basically a reversal of steps 38–40.

Additional security can be provided through additional means, such as storing each of the backup media in a different location, physically securing the backup media, or keeping the key(s) separate from all the backup media. Such variations are obvious and the invention does not depend on their use.

Administrative Features—The system provides the network administrator or security administrator with several features tuned to the corporate environment. The Administrator can block access of employees to certain features of the system, including secure deletion, steganography, etc. The Administrator is also given the capability to gain emergency access to files and E-mails generated by users on the network.

Decryption—Obviously, every encryption method also includes a decryption capability. The decryption is generally the equivalent of an encryption operation in reverse. The system of this invention can decrypt any message encrypted by the aforementioned methods, using the decryption method appropriate for each type of encryption. Multi-encrypted data is decrypted in the reverse order in which it was encrypted, using any decryption information available from the message itself.

Various means of accomplishing the secure data features described herein are possible. Since most of the procedures involve the manipulation of digital data, the preferred embodiment uses software as a means to perform the described functions. The use of firmware, or a combination of software and firmware, is also envisioned. The preferred embodiment operates in the Windows environment due to the extremely broad market acceptance of the Windows operating system. But the invention will operate equally well in other environments, including single- or multi-user operating systems and single- or multi-processor systems.

The invention maybe embodied in other specific forms without departing from the spirit of the invention or its essential characteristics. The present embodiments are to be considered as illustrative and not restrictive, the scope of the invention being indicated by the following claims rather than by the foregoing description. All changes which come within the meaning and the range of equivalency of the claims are intended to be embraced herein.

What is claimed is:

1. A method for selecting a plurality of discrete units with a secure selection key, said method comprising the steps of:
   providing an encryption key;
   copying said encryption key a plurality of times to form a data block;
   encrypting said data block with said encryption key to form a selection key, said selection key comprising a plurality of bits;
   providing a plurality of discrete units;
   associating each bit of said selection key with one of said plurality of discrete units;
   selecting only those discrete units whose associated bit has a particular logic state.

2. The method of claim 1, wherein the step of associating further comprises:
   associating each bit of said selection key with every nth discrete unit, where n is an integer.

3. The method of claim 1, wherein said particular logic state is a logic 'one'.

4. The method of claim 1, wherein said particular logic state is a logic 'zero'.

5. The method of claim 1, wherein said discrete unit is a data byte.

6. The method of claim 1, wherein the number of bits in said selection key equals the number of discrete units.

7. A system for selecting a plurality of discrete units with a secure selection key, said system comprising:
   an encryption key;
   means for copying said encryption key a plurality of times to form a data block;
   means for encrypting said data block with said encryption key to form a selection key, said selection key comprising a plurality of bits;
   a plurality of discrete units;
   means for associating each bit of said selection key with one of said plurality of discrete units;
   means for selecting only those discrete units whose associated bit has a particular logic state.

8. The system of claim 7, wherein the means for associating further comprises:
   means for associating each bit of said selection key with every nth discrete unit, where n is an integer.

9. The system of claim 7, wherein said particular logic state is a logic 'one'.

10. The system of claim 7, wherein said particular logic state is a logic 'zero'.

11. The system of claim 7, wherein said discrete unit is a data byte.

12. The system of claim 7, wherein the number of bits in said selection key equals the number of discrete units.

* * * * *